United States Patent
Son et al.

(10) Patent No.: US 10,993,069 B2
(45) Date of Patent: Apr. 27, 2021

(54) DYNAMICALLY ADAPTIVE MEDIA CONTENT DELIVERY

(71) Applicant: Snap Inc., Santa Monica, CA (US)

(72) Inventors: Aaron Son, Venice, CA (US); Brian Hendriks, Venice, CA (US)

(73) Assignee: Snap Inc., Santa Monica, CA (US)

( * ) Notice: Subject to any disclaimer, the term of this patent is extended or adjusted under 35 U.S.C. 154(b) by 419 days.

(21) Appl. No.: 14/801,206

(22) Filed: Jul. 16, 2015

(65) Prior Publication Data

US 2017/0019446 A1 Jan. 19, 2017

(51) Int. Cl.
*H04W 4/021* (2018.01)
*H04W 4/18* (2009.01)
(Continued)

(52) U.S. Cl.
CPC ......... *H04W 4/021* (2013.01); *H04L 65/1063* (2013.01); *H04L 65/4084* (2013.01);
(Continued)

(58) Field of Classification Search
CPC ..... H04L 65/80; H04L 65/4084; H04L 67/10; H04L 65/602; H04L 65/60; H04L 67/22; H04L 43/08; H04L 43/0882; H04L 47/38; H04L 65/601; H04L 47/823; H04L 65/604; H04L 67/1097; H04L 69/24;
(Continued)

(56) References Cited

U.S. PATENT DOCUMENTS 666,223 A 1/1901 Shedlock
4,581,634 A 4/1986 Williams
(Continued)

FOREIGN PATENT DOCUMENTS

CA 2887596 A1 7/2015
EP 2051480 A1 4/2009
(Continued)

OTHER PUBLICATIONS

Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.
(Continued)

*Primary Examiner* — Tan Doan
(74) *Attorney, Agent, or Firm* — Schwegman Lundberg & Woessner, P.A.

(57) ABSTRACT

Media content delivery method and systems are provided for transmitting media content to a mobile client device in a format automatically selected from alternative versions of the media content based on one or more dynamically variable resource parameters. The variable resource parameters can include historical device and/or network performance corresponding to one or more current attributes applicable to a request for media content delivery from the mobile client device, such as a current location of the device and/or a time value for the requested media content delivery. Similar media content can thus be delivered to similar mobile client device in different formats depending on, say, the time and location of respective requests for receiving the media content.

20 Claims, 7 Drawing Sheets

(51) Int. Cl.
*H04L 29/08* (2006.01)
*H04L 29/06* (2006.01)

(52) U.S. Cl.
CPC ............ *H04L 65/602* (2013.01); *H04L 65/80* (2013.01); *H04L 67/22* (2013.01); *H04W 4/18* (2013.01)

(58) Field of Classification Search
CPC ......... H04N 21/2402; H04N 21/47202; H04N 21/23439; H04N 21/44209; H04N 21/4524; H04W 4/021; H04W 4/18
USPC ....................................................... 709/232
See application file for complete search history.

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Ben Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach, Jr. et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,433,278 B2 | 4/2013 | Adams et al. |
| 8,471,914 B2 | 6/2013 | Sakiyama et al. |
| 8,472,935 B1 | 6/2013 | Fujisaki |

(56) References Cited

U.S. PATENT DOCUMENTS

| | | |
|---|---|---|
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,078 B2 | 7/2014 | Neubrand |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Roote et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0010955 A1* | 1/2005 | Elia ............ G06F 3/0482 725/88 |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233693 A1* | 10/2007 | Baxter ............ H04L 29/06027 |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Nguyen et al. |
| 2008/0092233 A1 | 4/2008 | Tian et al. |
| 2008/0094387 A1 | 4/2008 | Chen |
| 2008/0104503 A1 | 5/2008 | Beall et al. |

(56) References Cited

U.S. PATENT DOCUMENTS

| | | |
|---|---|---|
| 2008/0109844 A1 | 5/2008 | Baldeschwieler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0083431 A1* | 3/2009 | Balachandran ......... G06F 15/16 709/228 |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0172167 A1* | 7/2009 | Drai ....................... H04L 45/125 709/226 |
| 2009/0177299 A1 | 7/2009 | Van De Sluis et al. |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0023579 A1* | 1/2010 | Chapweske ........ H04N 7/17336 709/203 |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0192190 A1* | 7/2010 | Savoor ............... H04N 21/2343 725/109 |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0055360 A1* | 3/2011 | Jones ..................... G06F 15/16 709/219 |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0223930 A1 | 9/2011 | Todd |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0150978 A1 | 1/2012 | Monaco |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |

(56) References Cited

U.S. PATENT DOCUMENTS

| | | |
|---|---|---|
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0007263 A1* | 1/2013 | Soroushian ............. H04L 47/12 709/224 |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0060904 A1* | 3/2013 | Ur ............................ H04L 67/06 709/219 |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0122854 A1 | 5/2013 | Agarwal et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0223539 A1* | 8/2013 | Lee .................... H04N 21/4122 375/240.25 |
| 2013/0227476 A1 | 8/2013 | Frey |
| 2013/0232194 A1 | 9/2013 | Knapp et al. |
| 2013/0238762 A1* | 9/2013 | Raleigh ................. H04L 67/306 709/219 |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082192 A1* | 3/2014 | Wei .................... H04W 28/0231 709/224 |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0258463 A1* | 9/2014 | Winterrowd ........ H04L 65/4084 709/219 |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |

(56) References Cited

U.S. PATENT DOCUMENTS

| | | | |
|---|---|---|---|
| 2015/0178260 A1 | 6/2015 | Brunson | |
| 2015/0222814 A1 | 8/2015 | Li et al. | |
| 2015/0261917 A1 | 9/2015 | Smith | |
| 2015/0312184 A1 | 10/2015 | Langholz et al. | |
| 2015/0350136 A1 | 12/2015 | Flynn, III et al. | |
| 2015/0365795 A1 | 12/2015 | Allen et al. | |
| 2015/0378502 A1 | 12/2015 | Hu et al. | |
| 2016/0006927 A1 | 1/2016 | Sehn | |
| 2016/0014063 A1 | 1/2016 | Hogeg et al. | |
| 2016/0085773 A1 | 3/2016 | Chang et al. | |
| 2016/0085863 A1 | 3/2016 | Allen et al. | |
| 2016/0099901 A1 | 4/2016 | Allen et al. | |
| 2016/0180887 A1 | 6/2016 | Sehn | |
| 2016/0182422 A1 | 6/2016 | Sehn et al. | |
| 2016/0182875 A1 | 6/2016 | Sehn | |
| 2016/0205165 A1* | 7/2016 | Casalena | H04L 65/80 709/219 |
| 2016/0239248 A1 | 8/2016 | Sehn | |
| 2016/0277419 A1 | 9/2016 | Allen et al. | |
| 2016/0321708 A1 | 11/2016 | Sehn | |
| 2017/0006094 A1 | 1/2017 | Abou Mahmoud et al. | |
| 2017/0061308 A1 | 3/2017 | Chen et al. | |
| 2017/0287006 A1 | 10/2017 | Azmoodeh et al. | |

FOREIGN PATENT DOCUMENTS

| | | |
|---|---|---|
| EP | 20151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014108461 A1 | 7/2014 |
| WO | WO-2014115136 A1 | 7/2014 |
| WO | WO-2014194262 A2 | 12/2014 |
| WO | WO-2015192026 A2 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

"A Whole New Story", Snap, Inc., URL: https://www.snap.com/en-US/news/, (2017), 13 pgs.

"Adding photos to your listing", eBay, URL: http://pages.ebay.com/help/sell/pictures.html, (accessed May 24, 2017), 4 pgs.

"BlogStomp", StompSoftware, URL: http://stompsoftware.com/blogstomp, (accessed May 24, 2017), 12 pgs.

"Cup Magic Starbucks Holiday Red Cups come to life with AR app", Blast Radius, URL: http://www.blastradius.com/work/cup-magic, (2016), 7 pgs.

"Daily App: InstaPlace (iOS/Android): Give Pictures a Sense of Place", TechPP, URL: http://techpp.com/2013/02/15/instaplace-app-review, (2013), 13 pgs.

"InstaPlace Photo App Tell the Whole Story", URL: https://youtute/uF_gFkg1hBM, (Nov. 8, 2013), 113 pgs.

"International Application Serial No. PCT/US2015/037251, International Search Report dated Sep. 29, 2015", 2 pgs.

"Introducing Snapchat Stories", URL: https://www.youtube.com/watch?v=88Cu3yN-LIM, (Oct. 3, 2013), 92 pgs.

"Macy's Believe-o-Magic", URL: https://www.youtube.com/watch?v-xvzRXy3J0Z0, (Nov. 7, 2011), 102 pgs.

"Macys Introduces Augmented Reality Experience in Stores across Country as Part of Its 2011 Believe Campaign", Business Wire, URL: https://www.businesswire.com/news/home/20111102006759/en/Macys-Introduces-Augmented-Reality-Experience-Stores-Country, Jan. 2, 2011), 6 pgs.

"Starbucks Cup Magic", URL: https://www.youtube.com/watch?v=RWwQXi9RG0w, (Nov. 8, 2011), 87 pgs.

"Starbucks Cup Magic for Valentine's Day", URL: https://www.youtube.com/watch?v=8nvqOzjq10w, (Feb. 6, 2012), 88 pgs.

"Starbucks Holiday Red Cups Come to Life, Signaling the Return of the Merriest Season", Business Wire, URL: http://www.businesswire.com/news/home/20111115005744/en/2479513/Starbucks-Holiday-Red-Cups-Life-Signaling-Return, (Nov. 15, 2011), 5 pgs.

Carthy, Roi, "Dear All Photo Apps: Mobli Just Won Filters", URL: https://techcrunch.com/2011109/08/mobli-filters, (Sep. 8, 2011), 10 pgs.

Janthong, Isaranu, "Instaplace ready on Android Google Play store", Android App Review Thailand, URL: http://www.android-free-app-review.com/2013/01/instaplace-android-google-piay-store.html, (Jan. 23, 2013), 9 pgs.

Macleod, Duncan, "Macys Believe-o-Magic App", URL: http://theinspirationroom.com/daily/2011/macys-believe-o-magic-app, (Nov. 14, 2011), 10 pgs.

Macleod, Duncan, "Starbucks Cup Magic Lets Merry", URL: http://theinspirationroom.com/daily/2011/starbucks-cup-magic, (Nov. 12, 2011), 8 pgs.

Notopoulos, Katie, "A Guide to the New Snapchat Filters and Big Fonts", URL: https://www.buzzfeed.com/katienotopoulos/a-guide-to-the-new-snapchat-filters-and-big-fonts?utm_term=bkQ9qVZWe#.nv58YXpkV, (Dec. 22, 2013), 13 pgs.

Panzarino, Matthew, "Snapchat Adds Filters, A Replay Function and for Whatever Reason, Time, Temperature and Speed Overlays", URL: https://techcrunch.com/2013/12/20/snapchat-adds-filters-new-font-and-for-some-reason-time-temperature-and-speed-overlays/, (Dec. 20, 2013), 12 pgs.

Tripathi, Rohit, "Watermark Images in PHP and Save File on Server", URL: http://code.rohitink.com/2012/12/28/watermark-images-in-php-and-save-fiie-on-server, (Dec. 28, 2012). 4 pgs.

* cited by examiner

DYNAMICALLY ADAPTIVE MEDIA CONTENT DELIVERY

TECHNICAL FIELD

Embodiments of the present disclosure relate generally to data processing, data transmission techniques, and, more particularly, but not by way of limitation, to methods and systems for delivering media content to client computer devices.

BACKGROUND

User consumption of media content (such as video, image, and/or audio content) on mobile electronic devices has become increasingly prevalent. Media download responsiveness and quality on mobile devices can, however, often be unreliable due to variability in resource availability or performance.

Different mobile networks, for example, can display differing levels of performance, while the performance of a particular network can vary significantly depending, e.g., on the time of day and/or the physical location of the mobile device.

BRIEF DESCRIPTION OF THE DRAWINGS

Some aspects of the disclosure are illustrated in the appended drawings. Note that the appended drawings illustrate example embodiments of the present disclosure and cannot be considered as limiting the scope of the disclosure.

Figure 1:
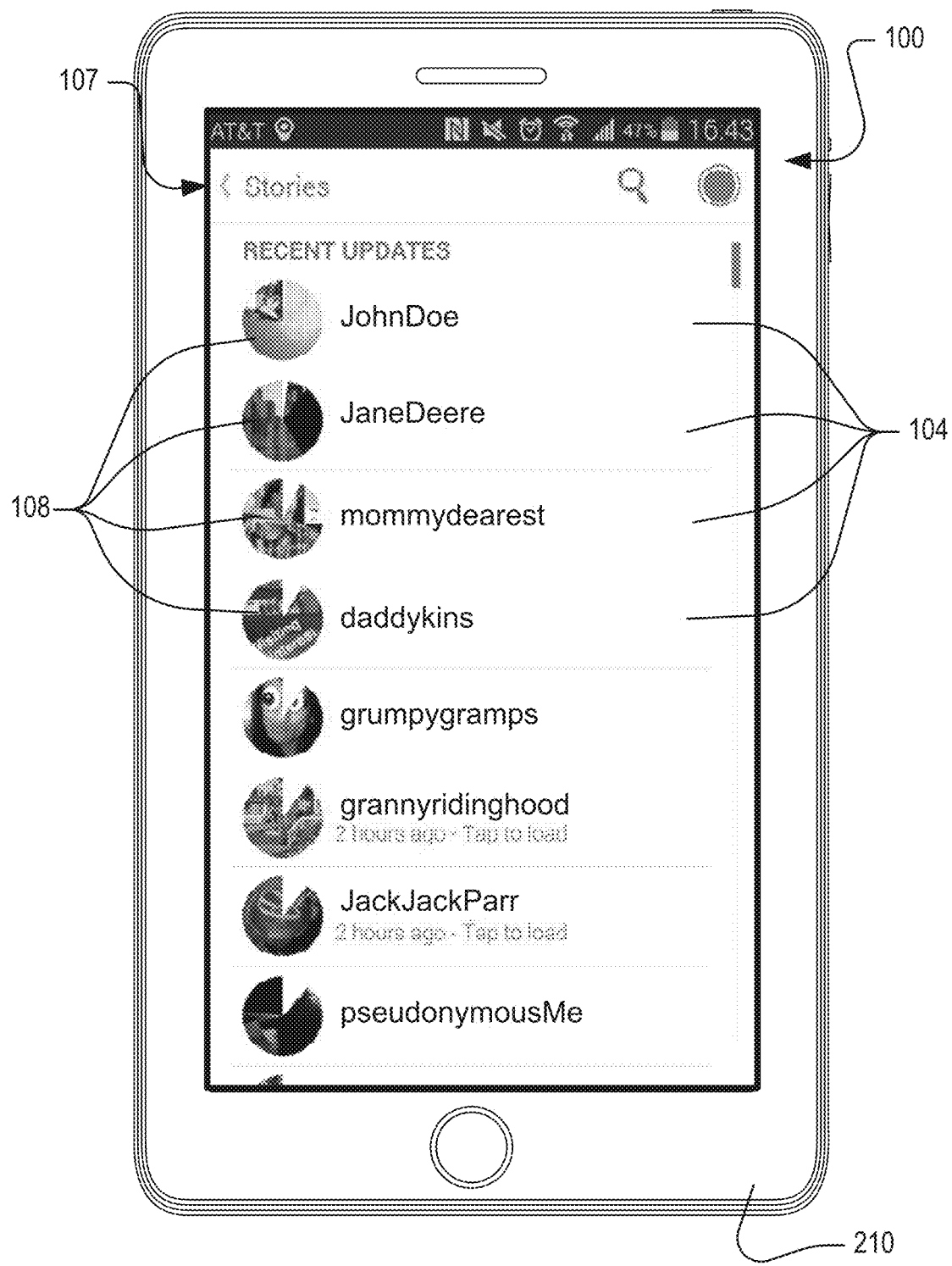
FIG. 1 is a schematic view of a mobile client device displaying a graphical user interface for requesting delivery of media content via a client application executing on the device, according to some embodiments.

The headings provided herein are merely for convenience and do not necessarily affect the scope or meaning of the terms used.

OVERVIEW

One aspect of the disclosure includes a media content delivery method that comprises transmitting a media content file to a mobile client device in a format automatically selected from alternative versions of the media content file based on one or more dynamically variable resource parameters. The variable resource parameters may be variable performance characteristics applicable to delivery of media content to the mobile device and/or to reproduction of media content on the mobile client device.

For example, a media content delivery system can be configured to identify that data transmission performance of a particular network connection over which the media content file is to be delivered has historically been relatively poor at the relevant time of day and, in response, select or deliver a version of a requested video file which is relatively smaller than other available versions (e.g., by employing more compact compression) and which thus places lesser demands on network bandwidth. The same video content may, in other instances, be transmitted to another device (or to the same device at a different time of day or over a different network) in a less compressed version of the video file, based on identification of better historical network performance applicable to that instance.

One version of a particular media content file (such as a file representing, for example, one or more digital images, one or more digital video clips, one or more animation sequences, one or more audio clips or audio book chapters, or the like) may thus be transmitted to some mobile client devices in one format, while an alternative version of the media content file, carrying the same media content, may be transmitted to another mobile client device, the particular version of the media content file to be delivered to the respective mobile client devices being automatically determined based on respective values for the one or more variable resource parameters that apply to the specific delivery event.

Downloading or delivery of media content files, in which media content carried by the file is reproducible only subsequent to completed file download, is to be distinguished from media streaming, in which the media content is reproducible while download is in progress. This is because applicable resource parameters and performance of streaming media delivery can be determined during the streaming delivery, in response to which characteristics of the streaming media can be changed during download. In contrast, download of discrete media content items or media content files demands finalization of content delivery format or configuration before delivery of an individual item or file is started.

Some embodiments include making available for delivery two or more alternative versions of the media content file, the alternative versions having different respective content delivery resource costs for delivery of the media content file to the mobile device and/or for reproducing or presenting the media content of the file on the mobile client device. Resource costs for delivery of the media content file may comprise compression costs (e.g., including server resource costs or processing costs for file compression to prepare the file for transmission), and/or transmission costs (e.g., including network bandwidth consumed in file transmission over the data network). For example, different file versions for common media content may have different bandwidth costs/demands. Instead, or in combination, the different file versions may have different on-device processing costs/demands for reproducing the media content on the mobile client device.

For example, a particular video clip may be made available for delivery in two different versions having been compressed using different compression formats with different respective compression ratios. A more compressed version of the file may, in such an example, consume greater server resources for compressing the video file, may consume lower transmission bandwidth due to transmission of a smaller version of the file, and may consume greater on-device processing resources for decompression. The system may automatically select for delivery an appropriate or optimal one of these two file versions based on the respective content delivery resource costs considered in combination with available server resources, network resources, and client device resources.

In some embodiments, the one or more variable resource parameters may be indicative of or associated with variable resource availability for file pre-processing (e.g., to prepare the file for transmission by file compression or the like), for file transmission, and/or for on-device media reproduction. The method may, in such cases, include selecting the specific version of the requested media content for delivery to the mobile device based, at least in part, on the available mobile device resources indicated by the one or more variable resource parameters and/or based, at least in part, on server resources available for file compression. For example, an application executing on the mobile client device may inform the server of available processing capacity of the client device and, in response to identifying that the available processing capacity is relatively limited or suboptimal for efficient media reproduction, the system may automatically select for delivery a version of the relevant media content file that places lower processing costs on the mobile client device for reproducing the requested media carried by the media content file.

A set of media content files that are to be delivered in association with one another or in a particular replay sequence (e.g., a set of associated photographs in a slideshow or a set of associated video clips) are in some embodiments available for delivery in different versions, with the different versions having different respective media reproduction properties or replay properties. In such embodiments, automated selection of a particular version of the set (or of at least some of the files in the set) may be based at least in part on the different media reproduction properties of the different alternative versions of the set. The media reproduction property of a set of media content files may, for example, include whether or not the set is capable of progressive reproduction, in which the media content of at least some files in the set can be reproduced on the mobile client device before download of the full set is completed. For example, a set of media content files comprising a stack of digital images may, in some embodiments, be available for delivery in one or more versions in which some of the pictures are viewable on the target device while other pictures in the stack are still in the process of downloading. One or more other versions of the same set of media content files may demand complete download of the whole stack of pictures before any of the pictures in the stack are available for viewing on the target device. In such cases, the method may include automatically selecting file versions and/or a version of the set that supports progressive reproduction in response to estimating that relatively poor data transmission resources and/or relatively limited on-device processing resources are expected to be available.

In some embodiments, the one or more variable resource parameters include an estimated resource performance value applicable to consumption of requested media content by the mobile client device. The estimated resource performance value can comprise an estimated value for substantially current or future resource performance based, at least in part, on historical resource performance data. Media content delivery can thus, in some embodiments, include calculating, e.g., an estimated applicable network transmission performance and/or an estimated applicable data processing performance of the mobile device, and then selecting one of a plurality of different versions of the media content file based on the estimated resource performance value values. In such cases, the one or more variable resource parameters may be determined based, at least in part, on historical performance data of the relevant resource(s) corresponding to one or more current attributes applicable to consumption of the requested media content by the mobile device.

For example, in response to a request for media content from a mobile device using AT&T cellular service over lunch time in December, the system may automatically identify that, historically, AT&T cellular data service at the particular current location of the mobile device is relatively poor in winter, and may, in response, automatically choose to transmit to the mobile device lower quality media content assets than would otherwise have been the case. This is to facilitate acceptable download speed and quality over the predicted lower-quality network connection. In some instances, the estimated resource performance value may be a predicted future resource performance value calculated with respect to expected future device attributes applicable to delivery and/or presentation of the requested media content at a particular future time.

It can thus be seen that, in some embodiments, the one or more current attributes include a current network of the mobile device, being a particular data network, such as a cellular network, to which the mobile device is currently connected and via which the requested media content is to be delivered. In such cases, the one or more variable resource parameters may include historical performance (e.g., historical data reception performance) of the mobile device when connected to the current network. Instead, or in addition, the one or more variable resource parameters may include historical performance of other mobile devices when connected to the current data network.

Instead, or in addition, the one or more current attributes may include a current physical location of the mobile device. In such cases, the one or more variable resource parameters may include historical performance of the mobile device when in substantially the same physical location, when in a physical location similar to the current physical location, or when within a geographical area corresponding to the current physical location. Instead, or in addition, the one or more variable resource parameters may include historical performance of other mobile devices when in substantially the same location, when in a physical location similar to the current physical location, or when within a geographical area corresponding to the current physical location.

Instead, or in addition, the one or more current attributes may include a current time value, for example comprising the current time of day, the current time of the week, the current time of the month, and/or the current time of the year. In such cases, the one or more variable resource parameters may include historical performance of the mobile device corresponding substantially to the current time value, and/or historical performance of other mobile devices at the current time value.

In some embodiments, the one or more variable resource parameters include one or more current wireless connection characteristics of the mobile device. The current wireless connection characteristics may include, in isolation or in combination, one or more measured values including: a current Wi-Fi channel, power ratio (dBm), a current interference measurement, a current cellular tower, current signal strength, and recent tower migration history.

Instead, or in combination, the one or more variable resource parameters taken into account for automated delivery version selection may, in some embodiments, include a recent change or delta in client activity volume from the same network and/or physical location from which a request for media content delivery is received. For example, the system is, in some embodiments, configured to select the appropriate file version for delivery in response to a request from a particular mobile device based, at least in part, on a recent delta in media content request volume from users sharing the same network and/or physical location.

The method may, in such cases, comprise selecting lower quality media assets for delivery to client devices on the network and/or at the physical location associated with a recent spike or above-threshold delta in media request volume. For example, requests for media content from mobile client devices of users at a well-attended event (such as a sports game, a concert, or the like) may display a significant increase or spike in volume during the game. A media content delivery system consistent with the disclosure may, for example, notice a large delta in media content request volume corresponding to the start of a football game at Qwest Field, in response to which file versions having relatively lower transmission costs/demands are automatically selected for delivery in response to the respective media content requests originating from a geofence region including Qwest Field. In contrast, a subsequent negative request volume delta (corresponding, e.g., to completion of the game) may automatically result in subsequent selection of relatively higher quality versions and/or delivery formats of the requested media content.

DETAILED DESCRIPTION

A specific example embodiment of a media content delivery method consistent with the disclosure will now be described broadly with reference to FIG. 1, after which more detailed description of example embodiments of systems, system components and operations follow with reference to FIGS. 2-7.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In FIG. 1, reference number 100 generally indicates a graphical user interface (GUI) displayed on a touchscreen 107 of a mobile client device in the example embodiment of a mobile smartphone 210 (see also FIG. 2) by operation of a social media application executing on the smart phone 210. In this example, the application whose GUI 100 is illustrated in FIG. 1 is a social media application providing video messaging functionality supported by a social media messaging and sharing service such as that provided by Snapchat, Inc.™ The GUI 100 in this example presents multiple sets or collections of media content items for selection by a user of the mobile phone 210, indicated in the GUI 100 as different respective "stories". Each story (i.e., each set of user-collated media items) is viewable on the smartphone 210 in response to user selection of an associated corresponding UI element in the form of respective UI cell 104 in a vertically extending column of cells 104 displayed on the screen 107.

Each cell 104 in the GUI 100 includes a download icon in the form of a thumbnail 108 and a username corresponding to the associated set of media content items. Each set of media content items in this example consists of a respective stack of digital pictures and/or digital video clips submitted by the associated user and is viewable in automated slideshow or flipbook fashion. Here, the stack of media content associated with each cell 104 comprises a sequence of image/video items arranged by the submitting user in a particular display order, e.g. according to a storyline to be conveyed by viewing the stack in sequence.

The mobile phone application thus automatically starts loading a corresponding stack of pictures and/or video clips in response to user-selection of any one of the cells 104. In this example, the mobile phone application is configured to automatically load a first media content item in the respective stack (e.g., a first video clip or a first digital photograph, determined by a submission order dictated by the submitting user), to display corresponding media content in predetermined fashion depending on the media content (e.g., displaying a photograph or picture for a set interval, or automatically starting and completing replay of a video clip), and thereafter to display the successive picture/video clip in the stack.

A method according to one embodiment of the disclosure provides for dynamic adaptation of the format and/or configuration of media content delivery to the mobile phone 210 to provide the interactive GUI 100 and to make the associated media content available for user consumption. In this example, dynamic modification of content delivery format responsive to variations in prevailing and/or predicted resource parameters are employed with respect to a number of different mechanisms for request, delivery, and reproduction of media content. A predefined plurality of alternative delivery formats is, in this example embodiment, made available for each of (a) the download thumbnails 108, and (b) the respective media items in the stacks of the various stories. Differences between alternative delivery formats may include differences in thumbnail 108 behavior, prefetching schemes for story media, and delivery of different versions of media content files that provide the image and/or video content of the various story cells 104.

The programmatic smartphone application and/or a media content delivery system (such as the example system 202 of FIG. 2) is, in the current example, configured to make the download thumbnails 108 available as a composite pie chart-type part-circular item that visualizes download progress by progressively adding circle sectors as corresponding media items forming part of the corresponding stack are downloaded. Each thumbnail sector can display part of an image presenting the corresponding media item in the stack. The thumbnails 108 are, in this example, adaptively modifiable in two respects, namely (a) whether the pie-sectors making up the preview thumbnails 108 are composed server-side or client-side (i.e., on the mobile phone 210), and (b) whether the thumbnails 108 are displayed in a high-resolution format or in a low-resolution format. In other embodiments, further alternative content delivery formats can provide for monochrome thumbnails and/or for thumbnails that do not serve as a download counter.

Server-side composition of thumbnail components or assets places greater demand on server-side processing resources and consumes greater transmission bandwidth, but it places lesser computation demands on the mobile phone 210. Based on automated assessment of various variable resource parameters, as discussed earlier, the system 202 automatically selects one of the four available versions for the thumbnails 108 and/or thumbnail assets. It will be appreciated that the predefined plurality of alternative versions for thumbnail rendering here comprises (1) precomposed, low-resolution media content items, (2) precomposed, high-resolution items, (3) non-precomposed, low-resolution items, and (4) non-precomposed, high-resolution items.

Automated selection of a particular delivery format can comprise automatically selecting an optimal one of the predefined alternatives. Such optimization may be done with respect to one or more predefined performance metrics. In this example, automated delivery format selection is programmed to select the available option that maximizes user experience, e.g., by minimizing client-side lag, latency, or response delays. In other embodiments, optimization may be with respect to a different performance metric (e.g., including server-side performance) or to a weighted combination of performance metrics.

Returning now to the example embodiment of FIG. 1, it will be seen that if, for example, the system 202 determines (based, e.g., on historical network performance of the phone 210 and of other mobile devices over the prevailing network connection at the corresponding time of day and week) that estimated network performance for delivering media content responsive to a request is relatively poor or falls below a predefined threshold value while sufficient processing and memory resources are available on the mobile phone 210, a delivery format version for the thumbnail assets and components is automatically selected to be non-precomposed, low-resolution items. If, for example, it is additionally established or estimated that limited on-device computational resources are available for thumbnail composition, the system 202 may automatically select for delivery the precomposed low-resolution version of each respective thumbnail 108 and/or thumbnail component. Automated selection may, in such cases, comprise automatically calculating, based on the applicable measured, estimated and/or predicted resource performance parameters, estimated client-side latency, lag, or delay for delivery and replay/presentation of the requested media content for the different available alternative delivery formats, and selecting that delivery format which has the lowest estimated value for these performance metrics.

Regarding prefetching of the media content items making up the respective stacks or stories corresponding to the respective cells 104 of the GUI 100, the available alternative delivery formats in this example include different prefetching schemes or configurations which can be employed depending on prevailing or expected network and/or device resource parameters. Considering that the user of the mobile phone 210 may select any one of the story cells 104 for viewing first, and further considering that any lag or delay between stack selection and commencement of replay is to be minimized or prevented, the method in this example provides for prioritizing download of a first number of media items in the stack of each cell 104. This is to be contrasted with sequentially pre-fetching all of the media items of one stack before downloading any media items of the next stack in the displayed list of stories. When the user then selects, say, the seventh story cell 104 in the GUI 100, the first few media items in the selected stack are immediately available for presentation (here, displaying digital images and replaying video clips), during which download of the remaining media items in the selected stack is prioritized.

This prefetching scheme is, in the current example embodiment, however, automatically modified for different requests in which different resource parameters (measured, estimated, and/or predicted) apply. For example, if prevailing or expected network performance is relatively good (e.g., having a data transmission parameter value exceeding a predefined threshold), a first few media items for each stack (e.g., the first four items for each stack) are automatically downloaded in the best resolution or quality version available for display. If, instead, prevailing or expected network performance is relatively poor (e.g., displaying below-threshold values for one or more predefined data transmission parameters), lower quality versions of the relevant media content files may initially be downloaded for the first few media items of each of the story stacks, after which higher-quality versions of the relevant media items are downloaded to replace the earlier downloaded lower-quality versions. In this example, each lower-quality file version has a lower resolution than that of the corresponding higher-quality file version. Instead, or in addition, different quality image files can have different compression ratios, in some instances using different compression protocols that vary in decompression quality.

In combination with dynamically adaptive selection of thumbnail format and dynamically adaptive selection of content prefetching scheme, the method in this example embodiment further provides for dynamically adaptive selection of media content file version or format. The description that follows details some aspects in which version optimization for video content is implemented in the example embodiment, but note that similar or analogous optimization may be performed with respect to digital images, audio, or other media content.

At least some of the media content stacks or stories for the respective cells 104 of the example GUI 100 consist of video files or items for displaying corresponding video clips on the mobile phone 210. One aspect of media content delivery adaptation for such video content may comprise making available for delivery video content at two or more different resolutions. The particular resolution for each video file is then automatically selected to minimize download and/or replay lag or latency based on measured prevailing resource performance and/or based on automatically determined expected resource performance based on relevant historical resource performance.

Instead, or in addition, the method may, in this example, provide for automated dynamically adaptive selection from differently compressed versions of the respective video content files providing the respective video items. One aspect of such compression optimization includes selecting whether to provide a requested video file in the compression format as uploaded by the submitting user, or whether to generate a differently compressed version for delivery. Resource constraints or considerations that factor into such automated version selection in this example embodiment include server-side computational resources and data transmission resources.

If, for example, a user submits a movie or video clip that is relatively poorly compressed, the system 202 has the capability of compressing the submitted video more compactly without significantly compromising eventual video playback quality. The re-compressed file version would, in such case, be significantly smaller and would therefore consume less transmission bandwidth, but re-compression of the submitted video file would demand computational resources on the media content delivery service that would otherwise be available for other purposes.

The system 202 is, in this example embodiment, configured to establish or estimate prevailing/estimated server resource availability and prevailing/estimated network resource availability, and to automatically select between the originally submitted video file and the recompressed video file for delivery to the requesting mobile phone 210. In some examples such automated selection comprises calculating which one of a number of differently compressed versions of the relevant media content file provides for optimal media consumption experience for the user, e.g., by minimizing latency or lag between stack selection and media replay on the mobile phone 210. If, for example, relatively poor network performance prevails or is expected, while sufficient server resources are available, the system 202 may automatically generate a recompressed version of the submitted video file, and deliver the recompressed version to the requesting mobile phone 210.

In some embodiments, the newly created recompressed version of the video file may be stored in a media content database, to be available for delivery in response to future requests for the corresponding video clip. Automated identification of an optimal or otherwise automatically selected delivery format for such future requests may be similar to that described above, but without factoring in server resource demands for file compression. This is because the recompressed version of the file is already available for delivery and need not be re-created. Some provide for such on-the-fly generation of alternative file versions or delivery formats (in which each different version of a media content file, apart from the originally submitted version, is created only upon first selection of that version for delivery responsive to an associated user request). Other embodiments provide for automatically generating, by default, one or more alternative file versions of each video content file upon initial submission thereof.

Various combinations of the different delivery formats for the media content accessible via the mobile phone app whose GUI 100 is shown in FIG. 1 may automatically be selected for different requests from the same phone 210 and for requests for media content delivery from different client devices, depending on the particular values for applicable variable resource parameters, as described earlier. In the example embodiment described with reference to FIG. 1, variable resource parameters or factors which are accounted for in automated optimal delivery format determination includes, but is not limited to:

- historical download and/or replay performance of the mobile phone 210 when it is connected to its current data network;
- historical download and/or replay performance of other mobile devices when they are connected to the current network of the mobile phone 210;
- historical performance of the mobile phone 210 when it was in a substantially similar physical location. In some instances, a single value may be provided for a single defined geographical location, such as a predefined geographic region (e.g., a county, precinct, or city), a distinct establishment (e.g., a restaurant or store), a distinct event venue (e.g., a stadium, arena, or music hall), a geofence area, or a circular area within a predefined maximum radius from the current geographic position of the phone 210. In other embodiments, a compound historical performance value may be calculated based on respective historical performance values for two or more nested locations or areas (e.g., being based both on historical performance at a particular venue and on historical performance within a county in which the venue is located);
- historical performance of other mobile devices when they were in a substantially similar physical location, analogous to physical location determinations discussed above;
- historical performance of the mobile phone 210 at this time of day, week, month, and/or year (or, in some embodiments, at a time value corresponding to a future date at which content delivery is expected to occur);
- historical performance of other mobile devices at the relevant time of day, week, month, and/or year;
- more finely attuned network connection parameters, such as specific parameters or measurements of the wireless connection (e.g., current Wi-Fi channel, dBm levels, interference measurements, cellular tower identity, signal strength, recent tower migration history, etc.)
- recent delta in request volume from the same network and/or from substantially the same physical location;
- existing device battery life;
- estimated expected future battery life attributes, calculated based on historical device utilization;
- existing device contention for resources (RAM, network, CPU);
- historical device contention for resources and/or historical computational performance during corresponding media reproduction operations, application configuration, time, location, etc.;
- historical data usage over the current network within the current billing period, e.g., to identify the likelihood of data transfer throttling triggered by high resource utilization in the recent past;
- any combination of the above-listed factors or any other factors described or mentioned herein as being relevant to automated delivery format optimization.

As will be understood from the foregoing description, the described example embodiment of media content delivery methods may thus enable a mobile device 210 or content server to "learn" adaptively, for example, that network performance for a particular venue over a corresponding interval has historically been relatively poor (e.g., as defined by predefined download speed ranges or free bandwidth), that there has been a recent spike in media content requests from the applicable physical location, and that computational resources of the requesting device are not currently unduly limited. In response to these determinations by the relevant media content server (or, in some embodiments, a corresponding application executing on the smartphone 210) in response to which, for example, highly compressed versions of requested media content files are automatically selected for delivery to the requesting phone 210. Media content delivery is thus optimized in that the relatively smaller versions of the media content files place relatively smaller demands on data transmission resources (for which there is high contention) and place relatively higher demands on on-device resources (for which there is relatively low contention).

Example System(s)

Figure 2:
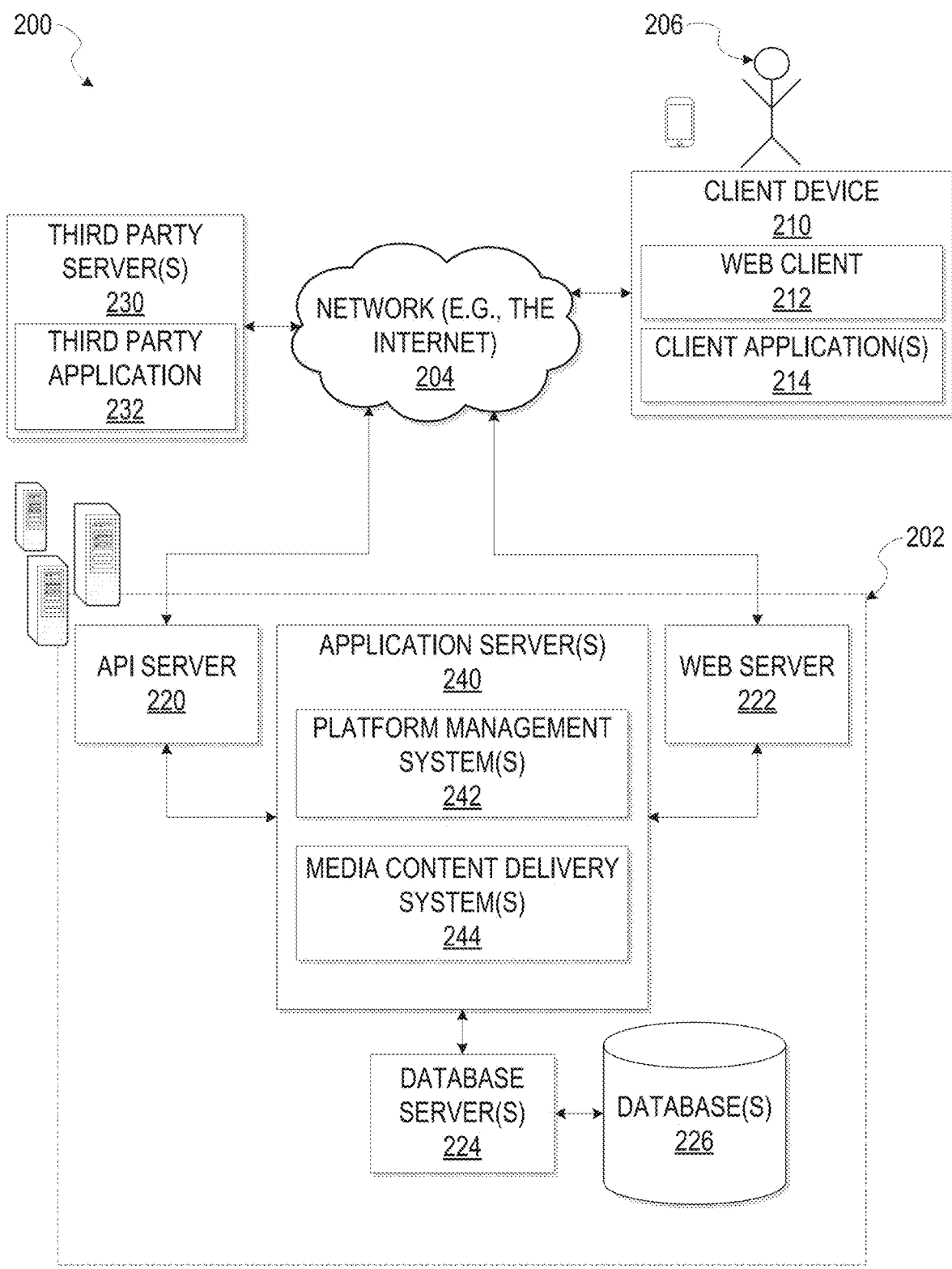
FIG. 2 is a block diagram illustrating a networked system configured to provide some media content delivery functionalities, according to some example embodiments.

FIG. 2, shows an example embodiment of high-level client-server-based network architecture 200 that provides for dynamically adaptive media content delivery services as disclosed herein. A networked system 202, in the example form of a social media platform system, provides server-side functionality via a network 204 (e.g., the Internet or wide area network (WAN)) to multiple mobile client devices 210. For clarity of illustration, only one mobile client device 210 is shown in FIG. 2, but many similar or analogous client devices 210 are typically connected to the system 202 at any given time. It will be appreciated that non-mobile client devices 210 may subscribe to services provided by the system 202, and that dynamic media format adaptation may, in some instances, be employed with respect to content delivery to such non-mobile client devices 210 (e.g., desktop computers). The system 202 is, in this example, configured to provide a social media service that includes media content-rich functionalities, such as video messaging and/or online video sharing.

The client device 210 can execute software for providing various functionalities associated with social media services and media content consumption. FIG. 2 illustrates, for example, a web client 212 (e.g., a browser, such as the Internet Explorer® browser developed by Microsoft® Corporation of Redmond, Wash. State), and an on-device client application 214 executing on client device 210.

Different types of client devices 210 on which social media functionalities are available via the system 202 may comprise, but are not limited to, mobile phones, desktop computers, laptops, portable digital assistants (PDAs), smart phones, tablets, ultra-books, netbooks, multi-processor systems, microprocessor-based or programmable consumer electronics, game consoles, set-top boxes, or any other communication device that a user may utilize to access the networked system 202. In some embodiments, the client device 210 may comprise a display module (not shown) to display information (e.g., in the form of user interfaces). In further embodiments, the client device 210 may comprise one or more of a touch screens 107, accelerometers, gyroscopes, cameras, microphones, global positioning system (GPS) devices, and so forth. The client device 210 may be a device of a user that is used to perform a transaction involving digital items within the networked system 202. In one embodiment, the networked system 202 is configured to provide a media content delivery service that responds to requests for media content from remote mobile client devices 210.

The users 206 associated with respective client devices 210 may be a people, machines, or other means of interacting with client devices 210. In some embodiments, the user 206 is not part of the network architecture 200, but may interact with the network architecture 200 via client device 210 or another means. For example, one or more portions of network 204 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

Each of the client devices 210 may include one or more applications (also referred to as "apps") such as, but not limited to, a web browser, messaging application, electronic mail (email) application, and the like. The client applications 214 can, in the example embodiment of FIG. 1, include social media apps that can execute on the device 210 and cooperate with the system 202 to submit media content requests and to optimize media content delivery, including apps that facilitate media content downloading to the device 210 (such as, for example, a Snapchat™ app). In some embodiments, a client application 214 on the client device 210 performs the described automated operations for optimizing media delivery formats. In other embodiments, such automated determinations or selection operations are performed by a content delivery server, such as application server 240 in FIG. 2. In such cases, the relevant client application 214 may be configured to gather relevant resource information from the device 210 (e.g., performance history data, current presentation on the device, current network connection information, and the like), and to communicate such information to the application server 240 for facilitating automated content delivery optimization.

In some embodiments, if the social media application is included in a given one of the client device 210, then this application is configured to locally provide the user interface and at least some of the functionalities with the application configured to communicate with the networked system 202, on an as needed basis, for data and/or processing capabilities not locally available (e.g., access to a social media platform to upload and/or download media content, etc.). Conversely, if the social media application is not included in the client device 210, the client device 210 may use its web browser to access the relevant social media site (or a variant thereof) hosted on the networked system 202.

An application program interface (API) server 220 and a web server 222 are coupled to, and provide programmatic and web interfaces respectively to, one or more application servers 240. The application servers 240 may host one or more systems for providing various functionalities, for example including a social media platform management system(s) 242 and a media content delivery system 244, each of which may comprise one or more modules or applications and each of which may be embodied as permanently configured hardware, hardware, executing software to dynamically configure one or more processor devices to perform various automated operations, firmware, or any combination thereof. The application servers 240 are, in turn, shown to be coupled to one or more database servers 224 that facilitate access to one or more information storage repositories or database(s) 226. In an example embodiment, the databases 226 are storage devices that store information to be posted on the social media platform, message data, and/or media content (e.g., digital photos, videos, and audio files). The databases 226 may also store digital item information in accordance with example embodiments.

Further, while the client-server-based network architecture 200 shown in FIG. 2 employs a client-server architecture, the present disclosure is not limited to such an architecture, and could equally well find application in a distributed, or peer-to-peer, architecture system, for example. The various platform management system(s) 242 and content delivery system(s) 244 could also be implemented as standalone software programs, which do not necessarily have networking capabilities.

The web client 212 may access the various platform management and media content delivery systems 242 and 244 via the web interface supported by the web server 222. At least some of the client application(s) 214 may comprise a programmatic client to cooperate with the system 202 to facilitate media content delivery. Additionally, a third party application 232, executing on a third party server(s) 230, is shown as having programmatic access to the networked system 202 via the programmatic interface provided by the API server 220. For example, the third party application 232, utilizing information retrieved from the networked system 202, may support one or more features or functions on a website hosted by the third party.

Figure 3:
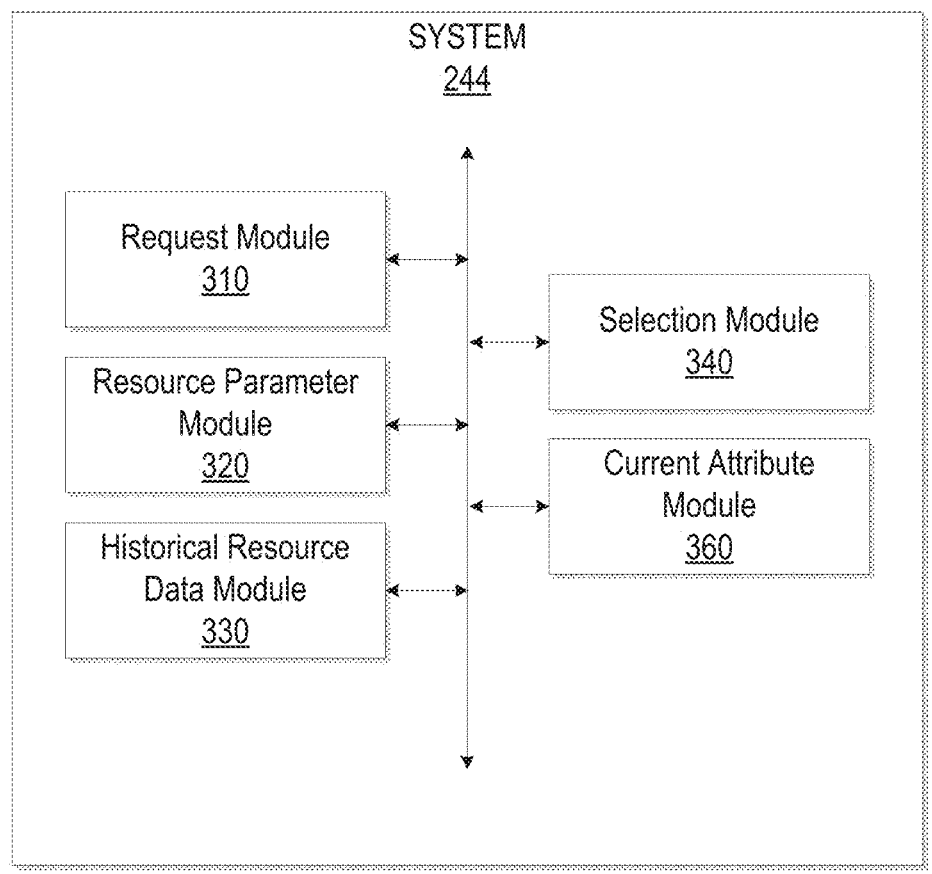
FIG. 3 is a schematic block diagram illustrating various hardware-implemented modules of a media content delivery system, according to some example embodiments.

FIG. 3 is a schematic block diagram of an example embodiment of a media content delivery system 244, in accordance with an example embodiment. The system 244 comprises a number of different hardware-implemented modules configured for automated performance of associated operations, as described in greater detail elsewhere herein. The various modules may, in some embodiments, be provided by permanently configured circuit arrangements, and may, in other embodiments, be provided by software executing on one or more dynamically reconfigurable processor devices, thereby to configure the processor devices sequentially, or in parallel, to provide the respective hardware-implemented modules. In some embodiments, the system 244 may be provided by server-side components, such as in the example embodiment of FIG. 2. In other embodiments, at least part of the system 244 may be provided by the mobile client device 210 executing custom software.

The system 244 includes a request module 310 configured to receive a request for delivery of media content to a mobile client device 210. In cases where the request module 310 is a server-side component, the request module 310 may be configured to receive an electronic communication originating from the relevant mobile device 210 that indicates the particular media content which is to be delivered. In other embodiments, where request module 310 forms part of the mobile client device 210, request module 310 may be configured to receive and interpret user input on the device 210, and to communicate an electronic request message to the relevant media content delivery server.

A resource parameter module 320 is configured to perform automated determination of a respective value for each of one or more variable resource parameters applicable to deliver the requested media content to the requesting device 210 and/or to present the requested media content on the client device 210 (e.g., by reproducing relevant images, video, and audio on the device 210). The resource parameter module 320 in this example embodiment cooperates with a historical resource data module 330 and a current attribute module 360 (both of which may, in some embodiments, form part of the resource parameter module 320) in order to determine the respective applicable resource parameter values. As described elsewhere herein, the resource parameter values may be currently measurable performance parameters (e.g., signal strength, on-device resource contention, and the like), estimated resource performance based on historical performance data provided by the historical resource data module 330 (e.g., historical performance of the device 210 and/or other devices when connected to the current network and/or when located in the current geographical area), and predicted future resource performance based on historical performance data. The current attribute module 360 may establish and communicate current attributes applicable to the request for media content delivery, in order to facilitate automated estimation of the resource parameter values. Such current attributes may include, for example, the physical location of the requesting device 210, the cellular network of the device 210, and the like.

The example system 244 further includes a selection module 340 configured for automated selection from a redefined plurality of alternative delivery formats of a specific delivery format which is to apply to media content delivery responsive to the request. Such automated selection is, in this example embodiment, based, at least in part, on the previously determined applicable resource parameter values, the established current attributes, and/or the measured live resource parameters, as discussed in greater detail elsewhere herein.

Figure 4:
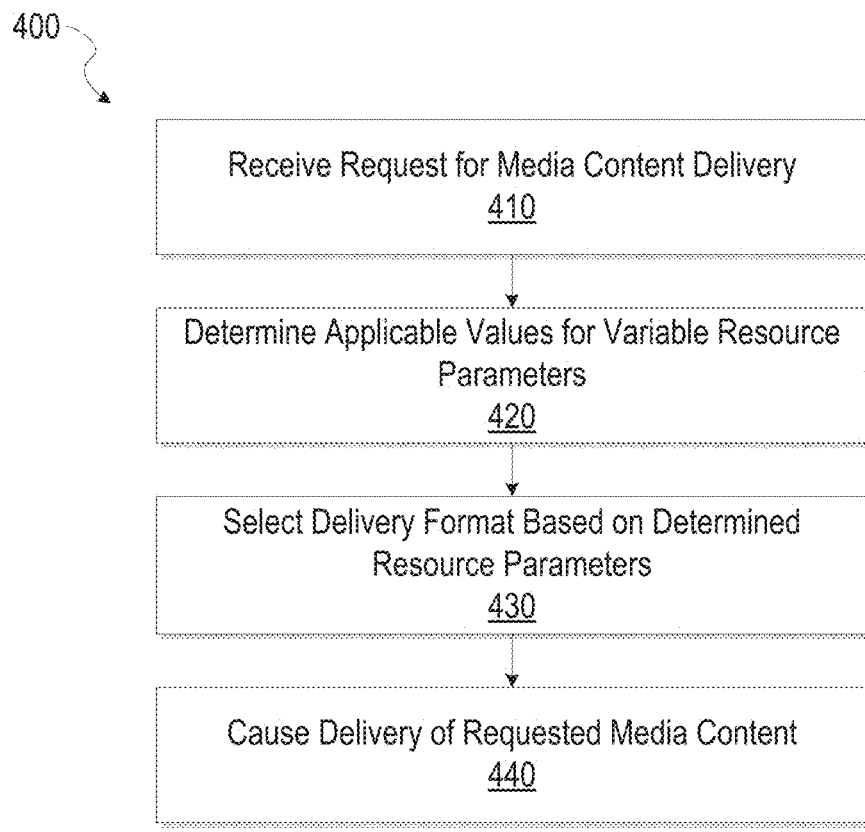
FIG. 4 is a high-level flow diagram of a media content delivery method, according to some example embodiments.

Turning now to FIG. 4, therein is shown in a high-level overview of an example embodiment of a method 400 for delivering media content according to the disclosure. The method 400 includes, at 410, receiving a request for delivery of media content to a requesting mobile client device 210 over a data transmission network 204. Delivery of the requested media content comprises transmission of the requested media content to the mobile client device 210, the media content including one or more media content files that can be processed by the mobile client device 210 to present the relevant media content on the device 210.

At 420, a respective value for each of a plurality of resource parameters applicable to delivery of the requested media content to the device 210 and to presentation of the requested media content on the device 210 is determined. At 430, a specific delivery format from a plurality of alternative delivery formats is automatically selected, e.g. by calculating an optimal one of the plurality of alternatives with respect to a predefined performance metric or combination of performance metrics.

At 440, the system 244 causes delivery of the requested media content to the requesting device 210 according to the automatically selected delivery format. As described in greater detail elsewhere, alternative delivery formats may provide, inter alia, for alternative versions of relevant media content files, for alternative delivery schemes or sequences, and/or for delivery of media content having different replay functionalities.

Figure 5:
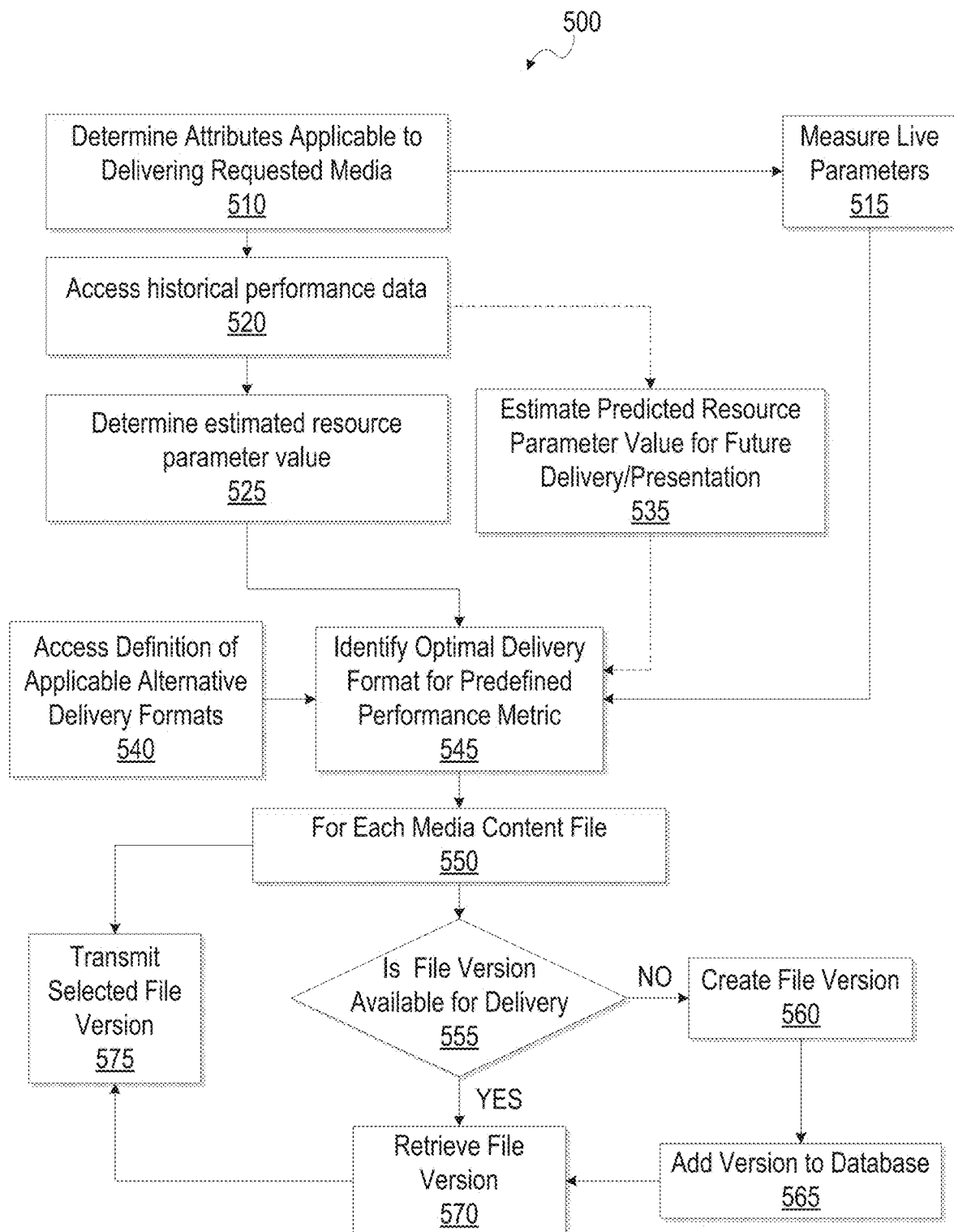
FIG. 5 is a more detailed flow diagram of a method for automated media content delivery optimization, according to some example embodiments.

In FIG. 5, reference numeral 500 indicates a more detailed flowchart of some operations forming part of an example embodiment of a method for automated media content delivery optimization. At operation 510, the system 244 automatically determines current attributes applicable to delivering requested media content. This may include, for example, determining the current physical location, identity, and cellular network of the requesting device 210. At operation 515, one or more currently measurable resource parameters are automatically determined. Again, these may include, for example, current signal strength, current on-device contention for resources, current server capacity, applicable time values, etc.

At operation 520, historical performance data associated with the request is automatically accessed. At operation 525, estimated resource parameter values are automatically determined based, at least in part, on the established current attributes and the relevant historical performance data. For example, historical performance values of the relevant device 210 and network 204 may be determined for a corresponding time and physical location. In some embodiments, predicted resource parameter values expected to apply to future content delivery or presentation may automatically be estimated at operation 535.

At operation 545, an optimal delivery format from a relevant predefined plurality of delivery formats is identified in an automated operation. To this end, a definition of the applicable alternative delivery formats (stored, e.g., in the database(s) 226) is accessed, at 540. Identification of the optimal one of these alternatives, at operation 545, in this example embodiment comprises calculating estimated performance metrics for the different respective alternatives based on the applicable current attributes, applicable estimated resource parameter values, and the live resource performance measurements established at operation 515. As discussed elsewhere herein, the performance metric with respect to which content delivery optimization is performed may be different in different embodiments. In this example embodiment, however, the optimization metric is a minimal value for user-experienced lag or latency.

Thereafter, it is determined, at 555, for each media content file (550), whether or not a corresponding version of the media content file is available in the database(s) 226. If the applicable file version is available the file is retrieved, at 570, and is then transmitted to the client device 210, at 575.

If, however, the corresponding version of the media content file is not available in the database(s) 226, then the corresponding alternative file version is created, at operation 560, and is added to the database(s) 226, at operation 565. The creation of such an alternative file version may comprise, for example, generating a version of an image or video file at a different resolution, at a different compression ratio, or using a different compression protocol. Thereafter, the newly created file version is retrieved and transmitted, at operation 575. Operations 550 through 575 are repeated for each media content file corresponding to the requested media content, with transmission occurring according to a particular selected delivery scheme or sequence.

It is a benefit of the example embodiments that it provides for improved user experience in consuming media content on a mobile device. Optimization of delivery formats, for example, achieves relatively uniform user experiences across different times and places, promoting user loyalty and adoption of applications that are rich in media content consumption.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In such cases, the various described hardware modules of a system or machine to perform the disclosed operations may not at any time have all of the modules described as forming part of the system or machine. Instead, a reconfigurable computer processor (e.g., a CPU) may, at various times, be configured by execution of specific software to form different corresponding modules.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an application specific integrated circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" or reference to a processor(s) configured to perform specified operations should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. As mentioned earlier in respect to embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network 204 (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-7 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things", while yet another combination produces a server computer for use within a cloud computing architecture. Not all combinations of such software and hardware architectures are presented here as those of skill in the art can readily understand how to implement various embodiments consistent with this disclosure in different contexts from the disclosure contained herein.

Software Architecture

Figure 6:
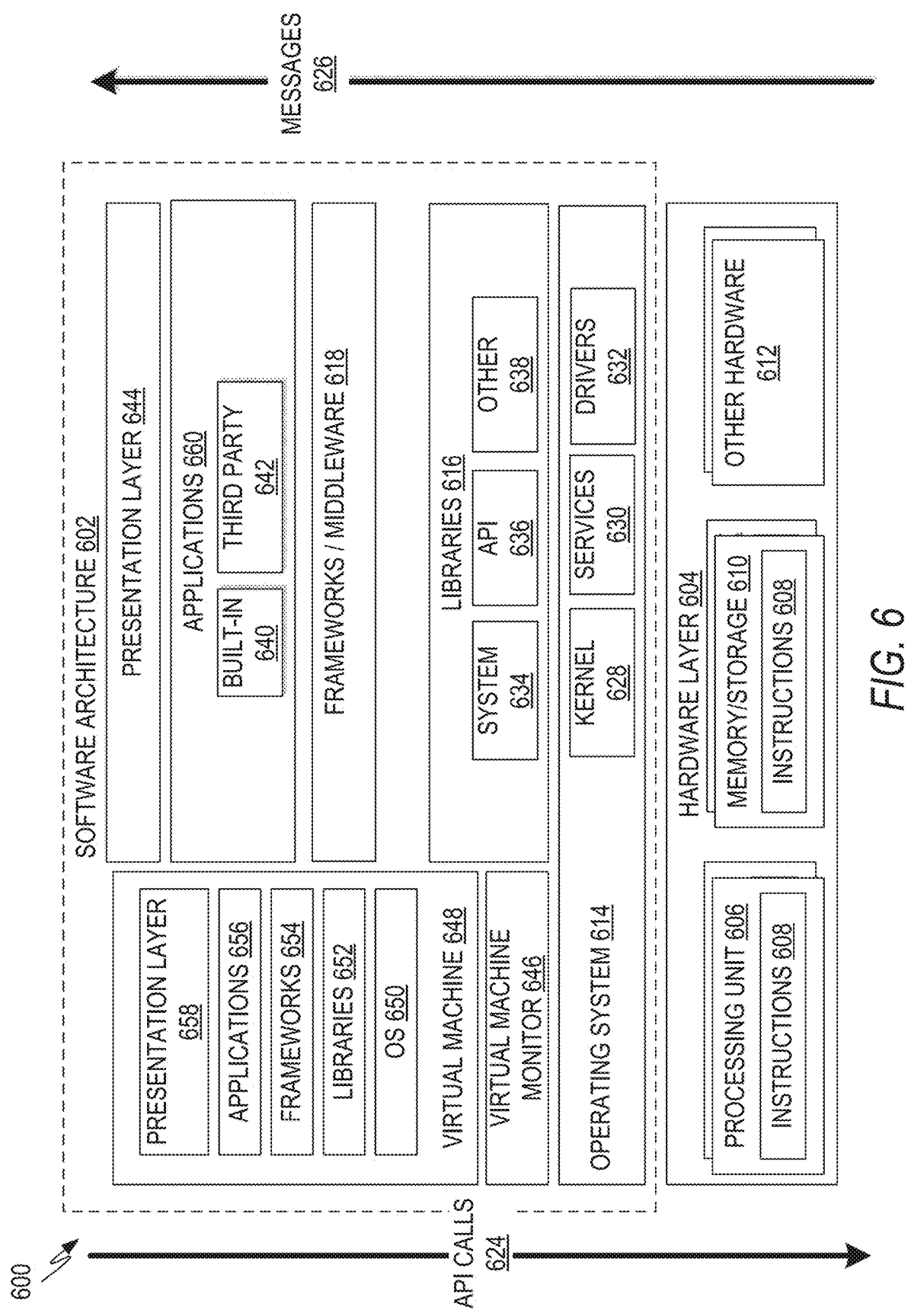
FIG. 6 is a block diagram illustrating an example of a software architecture that may be installed on a machine, according to some example embodiments.

FIG. 6 is a block diagram 600 illustrating a representative software architecture 602, which may be used in conjunction with various hardware architectures herein described. FIG. 6 is merely a non-limiting example of a software architecture and it will be appreciated that many other architectures may be implemented to facilitate the functionality described herein. The software architecture 602 may be executing on hardware such as machine 700 of FIG. 7 that includes, among other things, processors 710, memory 730, and I/O components 750. A representative hardware layer 604 is illustrated and can represent, for example, the machine 700 of FIG. 7. The representative hardware layer 604 comprises one or more processing units 606 having associated executable instructions 608. Executable instructions 608 represent the executable instructions of the software architecture 602, including implementation of the methods, modules and so forth of FIGS. 1-7. Hardware layer 604 also includes memory and/or storage modules 610, which also have executable instructions 608. Hardware layer 604 may also comprise other hardware as indicated by 612 which represents any other hardware of the hardware layer 604, such as the other hardware illustrated as part of machine 700.

In the example architecture of FIG. 6, the software 602 may be conceptualized as a stack of layers where each layer provides particular functionality. For example, the software 602 may include layers such as an operating system 614, libraries 616, frameworks/middleware 618, applications 660 and presentation layer 644. Operationally, the applications 660 and/or other components within the layers may invoke application programming interface (API) calls 624 through the software stack and receive a response, returned values, and so forth illustrated as messages 626 in response to the API calls 624. The layers illustrated are representative in nature and not all software architectures have all layers. For example, some mobile or special purpose operating systems 614 may not provide a frameworks/middleware layer 618, while others may provide such a layer. Other software architectures may include additional or different layers.

The operating system 614 may manage hardware resources and provide common services. The operating system 614 may include, for example, a kernel 628, services 630, and drivers 632. The kernel 628 may act as an abstraction layer between the hardware and the other software layers. For example, the kernel 628 may be responsible for memory management, processor management (e.g., scheduling), component management, networking, security settings, and so on. The services 630 may provide other common services for the other software layers. The drivers 632 may be responsible for controlling or interfacing with the underlying hardware. For instance, the drivers 632 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 616 may provide a common infrastructure that may be utilized by the applications 660 and/or other components and/or layers. The libraries 616 typically provide functionality that allows other software modules to perform tasks in an easier fashion than to interface directly with the underlying operating system 614 functionality (e.g., kernel 628, services 630 and/or drivers 632). The libraries 616 may include system 634 libraries (e.g., C standard library) that may provide functions such as memory allocation functions, string manipulation functions, mathematic functions, and the like. In addition, the libraries 616 may include API libraries 636 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 616 may also include a wide variety of other libraries 638 to provide many other APIs to the applications 660 and other software components/modules.

The frameworks 618 (also sometimes referred to as middleware) may provide a higher-level common infrastructure that may be utilized by the applications 660 and/or other software components/modules. For example, the frameworks 618 may provide various graphic user interface (GUI) functions, high-level resource management, high-level location services, and so forth. The frameworks 618 may provide a broad spectrum of other APIs that may be utilized by the applications 660 and/or other software components/modules, some of which may be specific to a particular operating system 614 or platform.

The applications 660 includes built-in applications 640 and/or third party applications 642. Examples of representative built-in applications 640 may include, but are not limited to, a contacts application, a browser application, a book reader application, a location application, a media application, a messaging application, and/or a game application. Third party applications 642 may include any of the built in applications 640 as well as a broad assortment of other applications. In a specific example, the third party application 642 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems 614. In this example, the third party application 642 may invoke the API calls 624 provided by the mobile operating system such as operating system 614 to facilitate functionality described herein.

The applications 660 may utilize built in operating system functions (e.g., kernel 628, services 630 and/or drivers 632), libraries 616 (e.g., system 634, APIs 636, and other libraries 638), and frameworks/middleware 618 to create user interfaces to interact with users 206 of the system 202. Alternatively, or additionally, in some systems, interactions with a user 206 may occur through a presentation layer, such as presentation layer 644. In these systems, the application/module "logic" can be separated from the aspects of the application/module that interact with a user 206.

Some software architectures utilize virtual machines. In the example of FIG. 6, this is illustrated by virtual machine 648. A virtual machine 648 creates a software environment where applications/modules can execute as if they were executing on a hardware machine (such as the machine 700 of FIG. 7, for example). A virtual machine 648 is hosted by a host operating system (operating system 614 in FIG. 6) and typically, although not always, has a virtual machine monitor 646, which manages the operation of the virtual machine 648 as well as the interface with the host operating system (i.e., operating system 614). A software architecture executes within the virtual machine 648 such as an operating system 650, libraries 652, frameworks/middleware 654, applications 656 and/or presentation layer 658. These layers of software architecture executing within the virtual machine 648 can be the same as corresponding layers previously described or may be different.

Example Machine Architecture and Machine-Readable Medium

Figure 7:
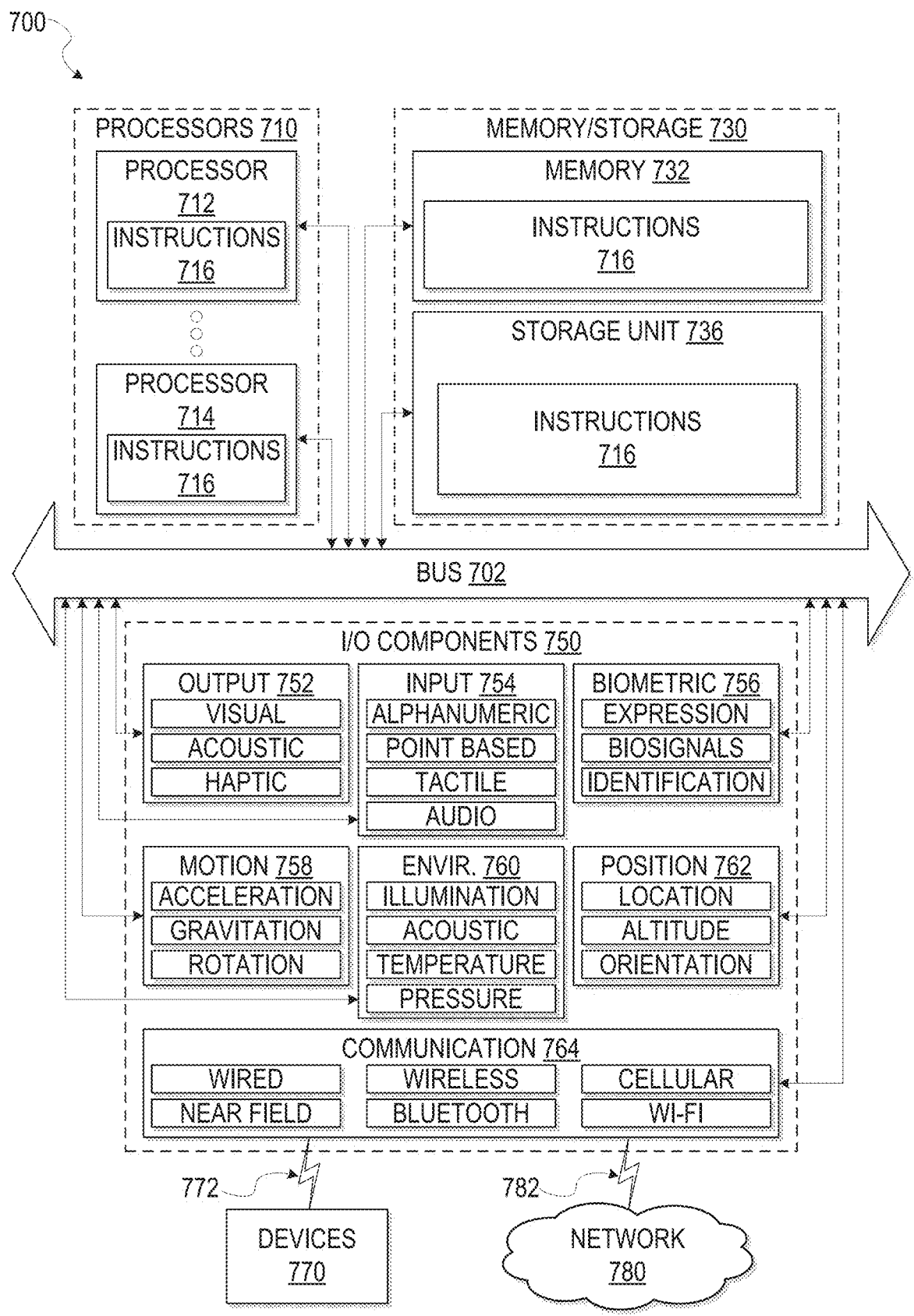
FIG. 7 illustrates a diagrammatic representation of a machine in the form of a computer system within which a set of instructions may be executed for causing the machine to perform any one or more of the methodologies discussed herein, according to an example embodiment.

FIG. 7 is a block diagram illustrating components of a machine 700, according to some example embodiments, able to read instructions 608 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example the instructions 716 may cause the machine 700 to execute the flow diagrams of FIGS. 4 and 5. Additionally, or alternatively, the instructions 716 may implement the respective modules of FIG. 3 and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, processor 712 and processor 714 that may execute instructions 716. The term "processor" is intended to include a multi-core processor 710 that may comprise two or more independent processors 712, 714 (sometimes referred to as "cores") that may execute instructions 716 contemporaneously. Although FIG. 7 shows multiple processors 712, 714, the machine 700 may include a single processor 710 with a single core, a single processor 710 with multiple cores (e.g., a multi-core process), multiple processors 710 with a single core, multiple processors 710 with multiples cores, or any combination thereof.

The memory/storage 730 may include a memory 732, such as a main memory, or other memory storage, and a storage unit 736, both accessible to the processors 710 such as via the bus 702. The storage unit 736 and memory 732 store the instructions 716, embodying any one or more of the methodologies or functions described herein. The instructions 716 may also reside, completely or partially, within the memory 732, within the storage unit 736, within at least one of the processors 710 (e.g., within the processor 710's cache memory), or any suitable combination thereof, during execution thereof by the machine 700. Accordingly, the memory 732, the storage unit 736, and the memory of processors 710 are examples of machine-readable media.

As used herein, "machine-readable medium" means a device able to store instructions 716 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine-readable medium" should be taken to include a single medium or multiple media (e.g., a centralized or distributed database 226, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen 107 configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen 107 that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772 respectively. For example, the communication components 764 may include a network interface component or other suitable device to interface with the network 780. In further examples, communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software. Language Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
receiving a request for delivery of media content to a mobile client device over a data transmission network, delivery of the requested media content comprising non-streaming transmission to the mobile client device of one or more media content files processable by the mobile client device to present the requested media content on the mobile client device subsequent to completed download of the media content by the mobile client device;
determining a respective value for each of one or more variable resource parameters applicable to delivery to and/or presentation on the mobile client device of the requested media content;
in an automated operation based, at least in part, on the one or more variable resource parameters, selecting from a predefined plurality of alternative delivery formats a delivery format specific to the request, the selecting including selecting a compositional format for one or more composite thumbnails that are to be displayed on the mobile client device as respective selectable user interface elements forming part of a graphical user interface, each composite thumbnail being composed from a respective plurality of media content items, the compositional format being selected from the group comprising:
a precomposed format, wherein the respective composite thumbnail is composed server-side and is delivered to the mobile client device as part of the requested media content; and
a non-precomposed format, wherein the respective composite thumbnail is composed client-side, delivery of the requested media content including delivery of the respective plurality of media content items, thus enabling composition of the respective composite thumbnail by the mobile client device; and
causing delivery of the requested media content to the mobile client device according to the selected delivery format specific to the requested media content.

2. The method of claim 1, wherein:
the one or more variable resource parameters include at least one estimated performance value determined based on historical performance data for a respective content delivery resource; and
the predefined plurality of alternative delivery formats comprises, for each of the one or more media content files, two or more alternative file versions of the media content file.

3. The method of claim 2, wherein at least two of the two or more alternative file versions for a respective media content file differ in compression format used for pre-delivery file compression.

4. The method of claim 2, wherein at least two of the two or more alternative file versions for a respective media content file differ in image resolution available for post-delivery presentation on the mobile client device.

5. The method of claim 1, wherein the predefined plurality of alternative delivery formats includes alternative delivery schemes for a set of media content files, the alternative delivery schemes comprising:
initial delivery of relatively lower-quality versions of at least some files in the set of media content files, followed by subsequent replacement by relatively higher-quality versions of corresponding media content files; and
initial delivery of relatively higher-quality versions of all delivered files in the set of media content files.

6. The method of claim 1, wherein the one or more variable resource parameters include previous data usage of the mobile client device over a current cellular network within a current billing period.

7. The method of claim 1, wherein the one or more variable resource parameters includes current availability of server-side resources for compressing the one or more media content files prior to transmission.

8. A system comprising:
one or more computer processor devices; and
one or more memories having stored thereon instructions for configuring the one or more computer processor devices, when executing the instructions, to perform operations comprising:
receiving a request for delivery of media content to a mobile client device over a data transmission network, delivery of the requested media content comprising non-streaming transmission to the mobile client device of one or more media content files processable by the mobile client device to present the requested media content on the mobile client device subsequent to completed download of the media content by the mobile client device;
automatically determining a respective value for each of one or more variable resource parameters applicable to delivery to and/or presentation on the mobile client device of the requested media content;
automatically selecting from a predefined plurality of alternative delivery formats, based at least in part on the one or more variable resource parameters; a delivery format specific to the request, the selecting including selecting a compositional format for one or more composite thumbnails that are to be displayed on the mobile client device as respective selectable user interface elements forming part of a graphical user interface, each composite thumbnail being composed from a respective plurality of media content items, the compositional format being selected from the group comprising:
a precomposed format, wherein the respective composite thumbnail is composed server-side and is delivered to the mobile client device as part of the requested media content; and
a non-precomposed format, wherein the respective composite thumbnail is composed client-side, delivery of the requested media content including delivery of the respective plurality of media content items, thus enabling composition of the respective composite thumbnail by the mobile client device; and
causing delivery of the requested media content to the mobile client device according to the selected delivery format specific to the requested media content.

9. The system of claim 8, wherein the one or more variable resource parameters include at least one estimated performance value determined based on historical performance data for a respective content delivery resource.

10. The system of claim 9, wherein the at least one estimated performance value comprises a predicted value of the corresponding variable resource parameter at a future time at which delivery and/or presentation of the requested media content is to be performed.

11. The system of claim 9, wherein the instructions are to configure the one or more computer processors to determine the one or more variable resource parameters by performing operations comprising:
accessing the historical performance data for the respective content delivery resource applicable to delivery and/or presentation of the requested media content;
identifying one or more current attributes applicable to the request; and
determining the at least one estimated performance value based, at least in part, on the historical performance data corresponding to the one or more current attributes applicable to the request.

12. The system of claim 11, wherein the one or more current attributes applicable to the request include a current cellular network to which the mobile client device is connected and over which the requested media content is to be delivered.

13. The system of claim 11, wherein the one or more current attributes applicable to the request include a current geographic location of the mobile client device.

14. The system of claim 11, wherein the one or more current attributes applicable to the request include a time and/or date value for delivery of the requested media content.

15. The system of claim 11, wherein the historical performance data comprises historical performance of the mobile client device to which the requested media content is to be delivered.

16. The system of claim 11, wherein the historical performance data comprises historical performance of mobile client devices other than the mobile client device to which the requested media content is to be delivered.

17. The system of claim 8, wherein the one or more variable resource parameters include a change over a predefined preceding period in data delivery request volume via the corresponding data transmission network and/or from a correspondent physical location.

18. The system of claim 8, wherein the one or more variable resource parameters include existing contention for on-device resources of the mobile client device.

19. The system of claim 9, wherein the at least one estimated performance value includes an estimated future battery life for the mobile client device, determined based on historical device utilization data for the mobile client device.

20. A non-transitory computer readable storage medium storing instructions for causing a machine, when the instructions are executed by the machine, to perform automated operations comprising:
receiving a request for delivery of media content to a mobile client device over a data transmission network, delivery of the requested media content comprising non-streaming transmission to the mobile client device of one or more media content files processable by the mobile client device to present the requested media content on the mobile client device subsequent to completed download of the media content by the mobile client device;
determining a respective value for each of one or more variable resource parameters applicable to delivery to and/or presentation on the mobile client device of the requested media content;
in an automated operation based, at least in part, on the one or more variable resource parameters, selecting from a predefined plurality of alternative delivery formats a delivery format specific to the request, the selecting including selecting a compositional format for one or more composite thumbnails that are to be displayed on the mobile client device as respective selectable user interface elements forming part of a graphical user interface, each composite thumbnail being composed from a respective plurality of media content items, the compositional format being selected from the group comprising:
a precomposed format, wherein the respective composite thumbnail is composed server-side and is delivered to the mobile client device as part of the requested media content; and a non-precomposed format, wherein the respective composite thumbnail is composed client-side, delivery of the requested media content including delivery of the respective plurality of media content items, thus enabling composition of the respective composite thumbnail by the mobile client device; and causing delivery of the requested media content to the mobile client device according to the selected delivery format specific to the requested media content.

\* \* \* \* \*